(12) United States Patent
Creaby et al.

(10) Patent No.: US 9,841,006 B2
(45) Date of Patent: Dec. 12, 2017

(54) METHOD AND APPARATUS FOR PROTECTING WIND TURBINES FROM EXTREME EVENTS

(75) Inventors: Justin Creaby, Broomfield, CO (US); Robert Bowyer, London (GB); Christopher Spruce, Leatherhead (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 883 days.

(21) Appl. No.: 13/980,271

(22) PCT Filed: Dec. 15, 2011

(86) PCT No.: PCT/DK2011/050481
§ 371 (c)(1),
(2), (4) Date: Oct. 23, 2013

(87) PCT Pub. No.: WO2012/097814
PCT Pub. Date: Jul. 26, 2012

(65) Prior Publication Data
US 2014/0035285 A1 Feb. 6, 2014

Related U.S. Application Data

(60) Provisional application No. 61/433,707, filed on Jan. 18, 2011.

(30) Foreign Application Priority Data

Jan. 18, 2011 (GB) .................. 1100856.2

(51) Int. Cl.
*F03D 7/02* (2006.01)
*F03D 17/00* (2016.01)

(52) U.S. Cl.
CPC ......... *F03D 7/0264* (2013.01); *F03D 7/0208* (2013.01); *F03D 7/0268* (2013.01);
(Continued)

(58) Field of Classification Search
CPC ........ F03D 9/002; F03D 17/00; F03D 7/0208; F03D 7/0264; F03D 7/0268;
(Continued)

(56) References Cited

U.S. PATENT DOCUMENTS 4,339,666 A   7/1982  Patrick et al.
4,613,762 A   9/1986  Soderholm
(Continued)

FOREIGN PATENT DOCUMENTS

DE   2623919 A1   12/1977
EP   0042521 A2   12/1981
(Continued)

OTHER PUBLICATIONS

Great Britain Search Report, Application No. GB1100856.2, dated May 18, 2011.
(Continued)

*Primary Examiner* — Christopher E Everett
*Assistant Examiner* — Yuhui R Pan
(74) *Attorney, Agent, or Firm* — Patterson + Sheridan, LLP

(57) ABSTRACT

A wind turbine has a Lidar device to sense wind conditions upstream of the wind turbine. Signals from the wind turbine are processed to detect an extreme change in wind direction. The detection is performed by differentiating the rate of change of wind direction and filtering for a period of time. On detection of extreme change the system controller takes the necessary evasive action which may include shutting down the turbine, commencing an immediate yawing action, and de-rating the turbine until the yawing action is complete.

18 Claims, 5 Drawing Sheets

(52) U.S. Cl.
CPC .......... *F03D 17/00* (2016.05); *F05B 2260/82* (2013.01); *F05B 2270/309* (2013.01); *F05B 2270/321* (2013.01); *F05B 2270/322* (2013.01); *F05B 2270/332* (2013.01); *F05B 2270/404* (2013.01); *F05B 2270/702* (2013.01); *F05B 2270/8042* (2013.01); *Y02E 10/723* (2013.01)

(58) Field of Classification Search
CPC ............ F05B 2260/82; F05B 2270/309; F05B 2270/321; F05B 2270/322; F05B 2270/332; F05B 2270/404; F05B 2270/702; F05B 2270/8042; Y02E 10/723
USPC .............................................. 290/44; 700/186
See application file for complete search history.

(56) References Cited

U.S. PATENT DOCUMENTS

| | | | |
|---|---|---|---|
| 4,651,017 A | 3/1987 | Longrigg | |
| 6,646,725 B1 | 11/2003 | Eichinger et al. | |
| 7,999,406 B2* | 8/2011 | Cardinal | F03D 7/0284 290/44 |
| 8,247,913 B2* | 8/2012 | von Mutius | F03D 7/0224 290/44 |
| 2004/0183307 A1* | 9/2004 | Yoshida | F03D 7/0204 290/44 |
| 2006/0033338 A1* | 2/2006 | Wilson | F03D 1/0608 290/44 |
| 2006/0140764 A1* | 6/2006 | Smith | F03D 7/0224 416/103 |
| 2007/0018457 A1* | 1/2007 | Llorente Gonzalez | F03D 7/0264 290/44 |
| 2007/0067067 A1 | 3/2007 | Stommel | |
| 2007/0176430 A1* | 8/2007 | Hammig | F03B 17/06 290/54 |
| 2009/0001724 A1* | 1/2009 | Lee | F03D 3/0418 290/44 |
| 2009/0261588 A1 | 10/2009 | Von Mutius et al. | |
| 2010/0135607 A1* | 6/2010 | Rogall | F03D 11/0008 384/477 |
| 2010/0135789 A1* | 6/2010 | Zheng | F03D 7/0224 416/1 |
| 2011/0076142 A1* | 3/2011 | Veldkamp | F03D 7/0224 416/1 |
| 2012/0056426 A1* | 3/2012 | Van Kuik | F03D 7/0224 290/44 |
| 2013/0033040 A1* | 2/2013 | Bowyer | F03D 7/028 290/44 |
| 2013/0062880 A1* | 3/2013 | Bowyer | F03D 7/0276 290/44 |
| 2014/0070538 A1* | 3/2014 | Bowyer | F03D 7/0224 290/44 |

FOREIGN PATENT DOCUMENTS

| | | |
|---|---|---|
| EP | 2025929 A2 | 2/2009 |
| EP | 2112373 A2 | 10/2009 |
| EP | 2665928 B1 | 4/2016 |
| GB | 2250394 A | 6/1992 |
| GB | 2398841 A | 9/2004 |
| WO | 9842980 A1 | 10/1998 |

OTHER PUBLICATIONS

International Search Report and Written Opinion, PCT/DK2011/050481, dated Apr. 19, 2012.
Pichugina et al. "Lidar Measurements of Extreme Inflow Events for Wind Energy Operations," 4th Symposium on Lidar Atmos. Applic., AMS, Phoenix, Arizona, Jan. 2009.
Harris et al., "Lidar for Turbine Control," Techincal Report, NREL/TP-500-39154, Jan. 2006, 54 pages.
Hand, et al. "Advanced Wind Turbine Controllers Attenuate Loads When Upwind Velocity Measurements Are Inputs," 44th AIAA Aerospace Sciences Meeting and Exhibit Jan. 9-12, 2006.
Kanve et al., "Wind Turbine Extreme Gust Control," ECN-E-08-069, 2008.
International Standard, IEC, Reference No. IEC 61400-1:2005(E).
Vaughan et al., "Laser Doppler Velocimetry Applied to the Measurement of Local and Global Wind," [Abstract Only] [Available Only] https://www.researchgate.net/publication/294597773_Laser doppler_velocimetry_applied_to_the_measurement_of_local_and_global_wind.
Morbieu et al., "The Airspeed Measurement With a Coherent Laser Radar," International Conference on Advanced Infrared Detectors and Systems, Jun. 3, 1086, pp. 154-157.
International Search Report for Application No. PCT/DK 98/00125 dated Jun. 22, 1998.

* cited by examiner

METHOD AND APPARATUS FOR PROTECTING WIND TURBINES FROM EXTREME EVENTS

FIELD OF THE INVENTION

This invention relates to wind turbines, and in particular, to the advance detection of upstream extreme wind conditions and the control of wind turbines in response to such detected conditions.

BACKGROUND OF THE INVENTION

It is important for a wind turbine to have advance knowledge to the condition of the wind which will shortly arrive at the turbine. Such knowledge gives the turbine controller sufficient time to adjust operating parameters, such as blade pitch angle or rotor speed, to match the oncoming conditions. This may be done for a variety of reasons. At lower wind speeds it is important to maximize the energy that can be extracted by the wind by setting parameters such as blade pitch angle to an optimum position. At higher wind speeds it is important to adjust turbine parameters to avoid operation under conditions which might lead to damage. Wind turbines have a rated power and when this power output is exceeded, the blade pitch angle and other operating parameters will be adjusted to reduce the amount of energy that is extracted from the wind. Wind turbines also need to be designed to withstand extreme operating conditions. Typically, these extreme conditions are rare single events or a small number of cumulative events which cause large, often unbalanced loads on the wind turbine and will damage the turbine or reduce the overall lifetime of the turbine components, such as the blades or the gearbox by a significant amount.

Wind turbines are required to meet extreme conditions as set out in International Standard IEC 61400-1 $3^{rd}$ Edition 2005. Section 6.3.2 defines a range of extreme wind conditions including extreme wind speed, extreme turbulence, and extreme direction change. In order to meet these requirements, wind turbines are required to be considerably over-engineered for normal use which greatly increases the amount of material used in turbine components, such as the blades, the gearbox, and tower. This in turn increases the cost of wind turbine installation and the cost of energy generation.

Many proposals have been made for determining advance wind conditions. Generally these include sensors placed on the turbine which observe the upstream wind.

One example is disclosed in EP-A-0970308 which discloses the use of a Lidar or similar remote sensing apparatus, mounted on the nacelle on the wind turbine, and sensing conditions several rotor diameters upstream of the turbine. Based on the sensed conditions the controller, which may be on board the turbine or may be a separate wind power controller, can instruct an individual turbine or group of turbines to change their operating parameters before the sensed wind conditions arrive at the turbine. Another example is disclosed in US-A-20060140764, in which the Lidar is mounted in the rotor hub and has a plurality of look directions that are inclined away from the rotational axis of the hub so that rotation of the hub ensures scanning. The multiple look directions may be achieved by using a number of dedicated Lidar systems and/or by using multiplexed Lidars or a beam splitter.

The known art provides a number of examples of advance sensing of wind conditions at a wind turbine. However, none of the art enables the detection of an extreme change in wind direction and so none is able to protect the turbine from the consequence of such an extreme direction change. The present invention aims to address this deficiency in the prior art.

Accordingly, the invention provides a control system for a wind turbine, comprising; a device mounted on the wind turbine to sense a property of wind conditions at a position upwind of the wind turbine; a controller for receiving and processing signals from the sensing device to detect an extreme change in wind direction upwind of the wind turbine, and for generating one or more control signals for varying an operating parameter of the wind turbine in response to the detected extreme change in wind direction, wherein the controller comprises a differentiator for measuring the rate of change of a wind parameter.

The invention also provides a method of controlling a wind turbine, comprising; sensing a property of wind conditions at a position upwind of the wind turbine using a remote sensing device mounted on the turbine; receiving and processing signals from the sensing device at a controller to detect an extreme change in wind direction upwind of the wind turbine the processing comprising differentiating a measured wind parameter to determine the rate of change of that parameter; and generating one or more control signals for varying an operating parameter of the wind turbine in response to the detected extreme change in wind direction.

Embodiments of the invention have the advantage that by differentiation of a suitable wind parameter, the rate of change of that parameter can be determined and the severity of a change of wind direction determined. This enables the system controller to determine whether there is an extreme direction change as defined by IEC 61400-1 discussed below and, thus, whether evasive action need be taken.

In one preferred embodiment of the invention the differentiator differentiates the wind direction. A filter may determine whether the rate of change of wind direction exceeds a predetermined value for a predetermined period of time. This has the advantage that instantaneous changes in direction, which may be caused by turbulence, are not flagged as extreme events and an extreme event is only signalled when the detected change is maintained for a period of time.

The predetermined value of the rate of change of wind direction may be dependent on the magnitude of the measured wind speed. This is advantageous as the higher the wind speed, the lower the change in direction required to cause over-loading and damage.

In one preferred embodiment, the predetermined value or the rate of change of wind direction is 5°/s. The predetermined period of time may be at least 3 seconds.

In another preferred embodiment of the invention, the sensed wind parameter is wind speed, and wind speed signals are resolved into axial and lateral components. The differentiator acts on the lateral component to determine the rate of change of wind lateral wind speed. This approach is advantageous as it may be more accurate than determining a change in wind direction by looking at the angle of the wind to the axis of rotation of the wind turbine rotor.

Preferably the sensing device senses the wind parameter at a plurality of distances upwind of the wind turbine. This has the advantage that changes in the oncoming wind front can be detected so that unnecessary evasive action is not taken when an extreme change in direction detected at a far distance degrades into an event that is not classed as extreme as it approaches the turbine.

Preferably the sensing device is a multiple beam Lidar having a multiple range gate.

The control signal generated by the controller in response to a detected extreme change of direction may comprise a turbine shutdown command, or a turbine yaw command.

In the case of a yaw command the controller may additionally command the turbine to de-rate until the yawing action is complete.

The invention also resides in a wind turbine having a control system as defined above.

BRIEF DESCRIPTION OF THE DRAWINGS

Embodiments of the invention will now be described, by way of example only, and with reference to the accompanying drawings, in which.

DESCRIPTION OF PREFERRED EMBODIMENT

International Standard IEC 61400-1 $3^{rd}$ Edition, sets out design requirements for wind turbines. Chapter 6.3.2 referred to above sets out and defines extreme wind conditions including wind sheer events, peak wind speeds due to storms and rapid changes in wind speed and direction. The magnitude of an extreme direction change is given by:

$$\theta_e = \pm 4 \arctan\left(\frac{\sigma_1}{V_{hub}\left(1 + 0.1\left(\frac{D}{\Lambda_1}\right)\right)}\right)$$

where $\theta_e$ is the extreme direction change magnitude $\sigma_1$ is given by $\sigma_1 = I_{ref}(0.75V_{hub}+b)$; $b=5.6$ m/s Iref is the expected value of hub-height turbulence intensity at a 10 min average wind speed of 15 m/s Vhub is the wind speed at hub height D is the rotor diameter $\Lambda_1$ is the turbulence scale parameter, according to $\Lambda_1 = \begin{cases} 0.7z & z \leq 60 \text{ m} \\ 42 \text{ m} & z \geq 60 \text{ m} \end{cases}$ The extreme direction change transient, $\theta(t)$, shall be given by $$\theta(t) = \begin{cases} 0° & \text{for } t < 0 \\ \pm 0.5\theta_e(1 - \cos(\pi t/T)) & \text{for } 0 \leq t \leq T \\ \theta_e & \text{for } t > T \end{cases}$$

where T=6 s is the duration of the extreme direction change. The sign shall be chosen so that the worst transient loading occurs. At the end of the direction change transient, the direction is assumed to remain unchanged. The wind speed shall follow the normal wind profile model.

Figure 1:
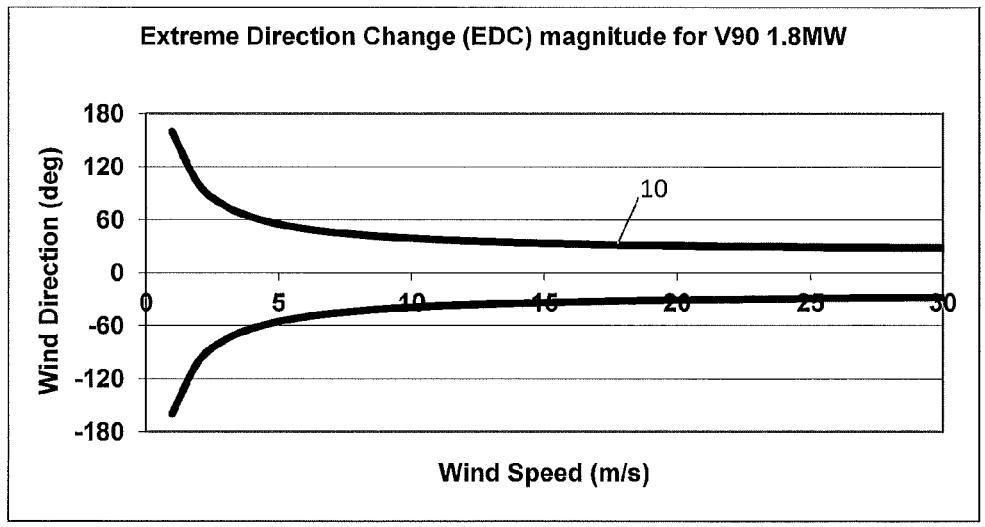
FIG. 1 is a graph of wind direction against wind speed showing an extreme change in direction.

The transition into an extreme direction change is shown for a Vestas V90 1.8MW wind turbines in FIGS. 1 to 4. FIG. 1 is a graph of wind speed against wind direction with the thick line 10 showing the transition to an extreme direction change based upon the formula expressed in the equation above. Thus, a change of about +/−60° is considered to be extreme at a low wind speed of 5 m/s but at higher wind speeds, a much smaller wind change over the designed period t=6s is considered extreme. At 25 m/s a change of about 30° is treated as extreme.

Figure 2:
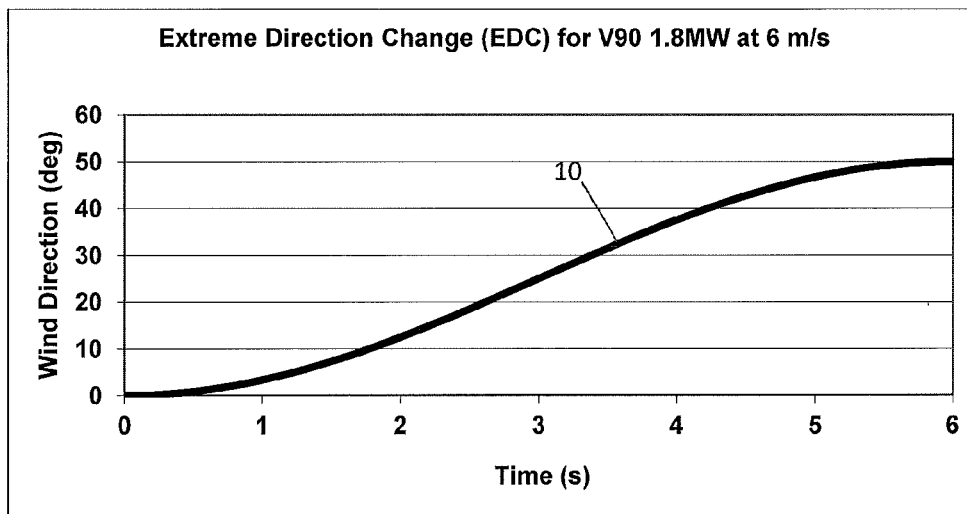
FIG. 2 is a similar graph to FIG. 1 of wind direction against time at a wind speed of 6 m/s.
Figure 3:
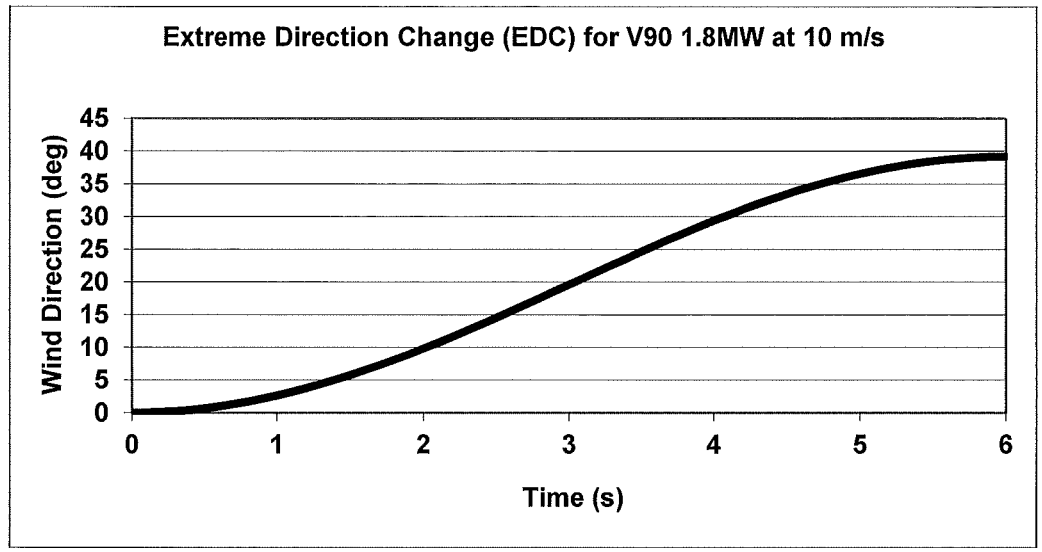
FIG. 3 is a similar graph to FIG. 2 at a wind speed of 10 m/s.
Figure 4:
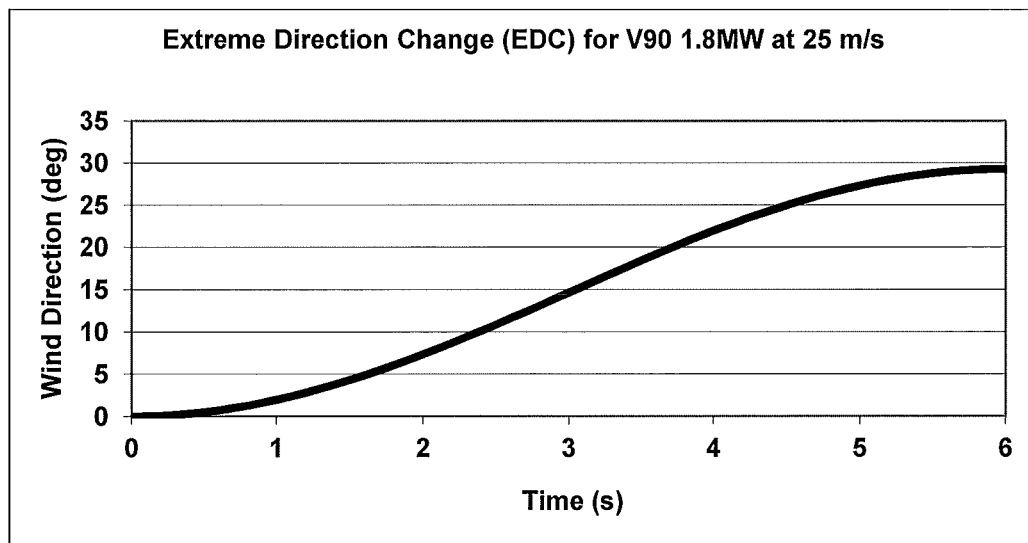
FIG. 4 is a similar graph to FIG. 3 at a wind speed of 25 m/s.

FIGS. 2 to 4 show this data as changes in wind speed over time at fixed wind speeds of 6 m/s (FIG. 2); 10 m/s (FIGS. 3); and 25 m/s (FIG. 4). The figures show that the rate of change is more important than the actual magnitude of the change as the rate of change determines the ability of the turbine to act. A wind direction that changes slowly over time is less likely to cause a problem to the turbine controller as the controller will have time to adjust turbine operating parameters in accordance with the change, whereas a rapid change may not give the turbine controller sufficient time to react. As wind speeds increase, the rate of change of direction that the controller can handle adequately decreases as is reflected in the graphs which show the extreme transition occurring at a much lower angle for higher wind speeds that for lower wind speeds. In all three examples shown in FIGS. 2 to 4, the extreme transition is a gentle S-shaped curve, which is essentially a straight line over it's mid-portion between about 2 and 4 s.

Figure 5:
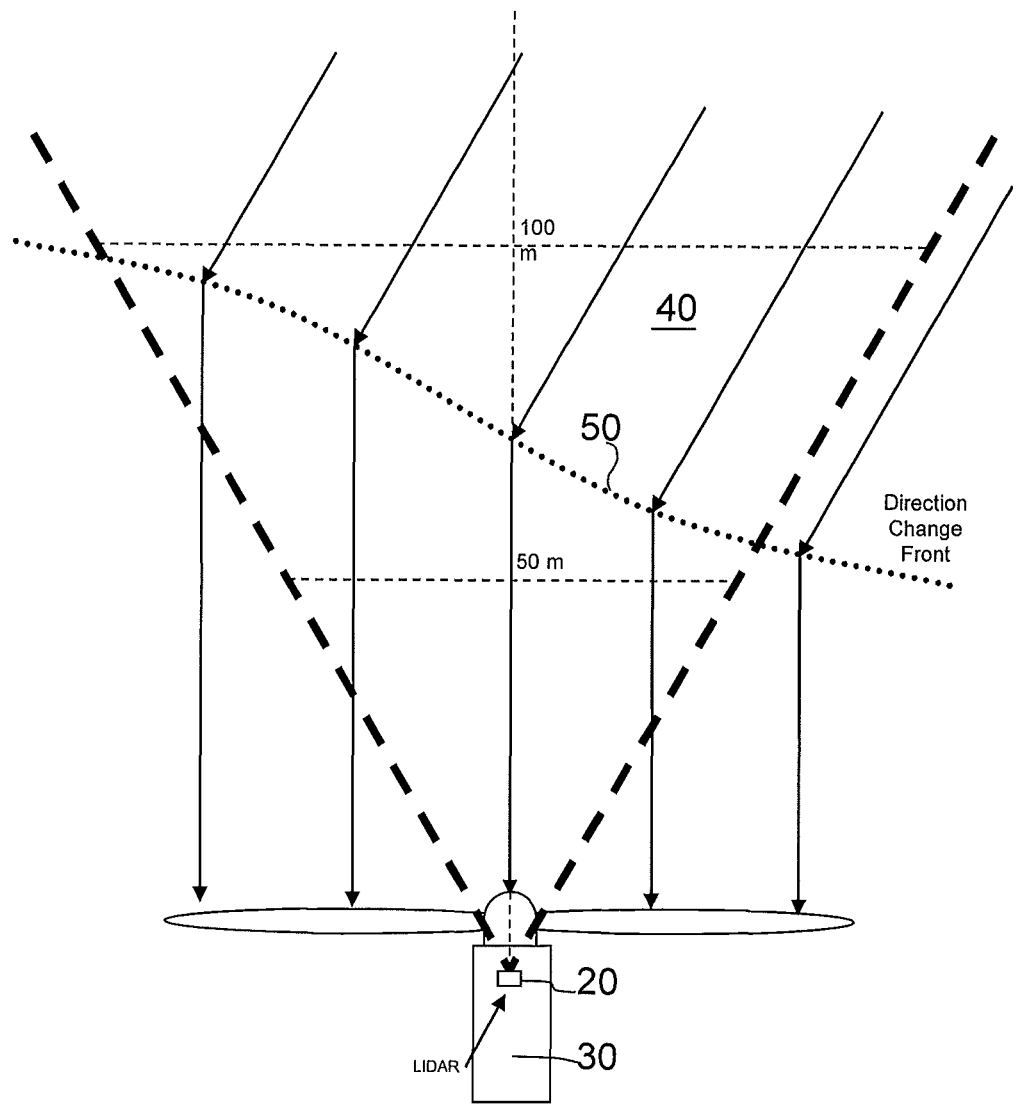
FIG. 5 is a schematic overview of a wind turbine having a Lidar embodying the invention and showing an oncoming wind front with an extreme change in wind direction.

FIG. 5 illustrates an embodiment of the invention in which a Lidar or similar remote sensing apparatus 20 is mounted on a wind turbine 30. It is presently preferred to mount the Lidar on the top surface of the turbine nacelle behind the rotor blades with a look direction extending generally in front of the blades. Alternative locations for the Lidar may be used, for example it may be mounted in hub to rotate with the hub to provide a conical scan.

It is preferred, but not essential, that the Lidar is a multiple gate range Lidar. This means that the Lidar is capable of sensing wind conditions at a plurality of distances from the wind turbine. This makes it possible to monitor the progress of a detected extreme event which may reduce in intensity as it approaches the wind turbine. This is important as it prevents evasive action being taken which is unnecessary if the severity of the event diminishes as it approaches the turbine. Reacting to an extreme event is undesirable unless absolutely necessary and will cause a temporary loss in energy production. Sensing wind conditions relatively far from the turbine, however, is desirable as it gives more time for the turbine to react.

The Lidar is a multiple beam Lidar having at least two beams enabling it to sense the direction of movement. Although not essential, the Lidar preferably has between three and five beams. These beams may be produced by any suitable method, for example using a single Lidar device with a beam splitter or multiplexer or by using a plurality of devices.

In FIG. 5 the Lidar 20 senses wind conditions at two ranges: 50 m and 100 m. This is exemplary only and different distances and a different number of distances may be chosen depending on the site and the number of ranges the chosen Lidar can measure. A wind front 40 is shown advancing on the turbine. This front changes direction at a point between the two ranges with the direction change front being shown by dotted line 50. At the 50 m range the Lidar detects zero wind direction, that is, the wind direction is parallel to the axis of rotation of the turbine. At 100 m the Lidar and associated processor detects an angle of about 30° over a 6 second period or 5° per second. Depending on the wind speed, this change in angle could represent an extreme change. To enable this to be determined, the controller differentiates the signal provided by the Lidar to determine the rate of change of direction. In practice, wind direction signals will frequently change instantaneously by this amount. However, in determining whether the change may be treated as an extreme event, it is important to determine whether this rate of change is maintained over a period of time, for example between about 2 to 5 seconds, preferably for at least three seconds and more preferably at least four seconds. This may be achieved by filtering the differentiated signal. If the signal reaches the threshold of 5° per second, then the controller can command evasive action.

The controller may determine the angle of the wind direction with respect to the axis of rotation of the wind turbine rotor. Alternatively it may look at the detected wind velocity and resolve that velocity into lateral and axial components with the lateral component representing the velocity of travel in a direction parallel to the plane of rotation of the wind turbine rotor, or normal to its axis of rotation. Once the lateral component has been determined it is differentiated to give the acceleration or rate of change of the lateral component. If that acceleration exceeds the given threshold then action is taken. The threshold may be exceeded for a time period as mentioned above for the change in direction to be treated as an extreme change. The time period may depend on the magnitude of the acceleration so that a more rapidly changing wind front may need to be detected for a shorter time than one which only just exceeds the extreme event threshold for evasive action to be taken.

Once the controller detects that the threshold has been exceeded for the predetermined time it commands the turbine to take evasive action. This may require a controlled shut down or an emergency shut down of the turbine or some other action such as varying the blade pitch angle for the output power. Alternatively, or additionally, the controller may override the turbine yaw to start an immediate yawing procedure.

The turbine may be de-rated until the yawing action is complete. The choice of evasive action will depend on the severity of the extreme event.

Figure 6:
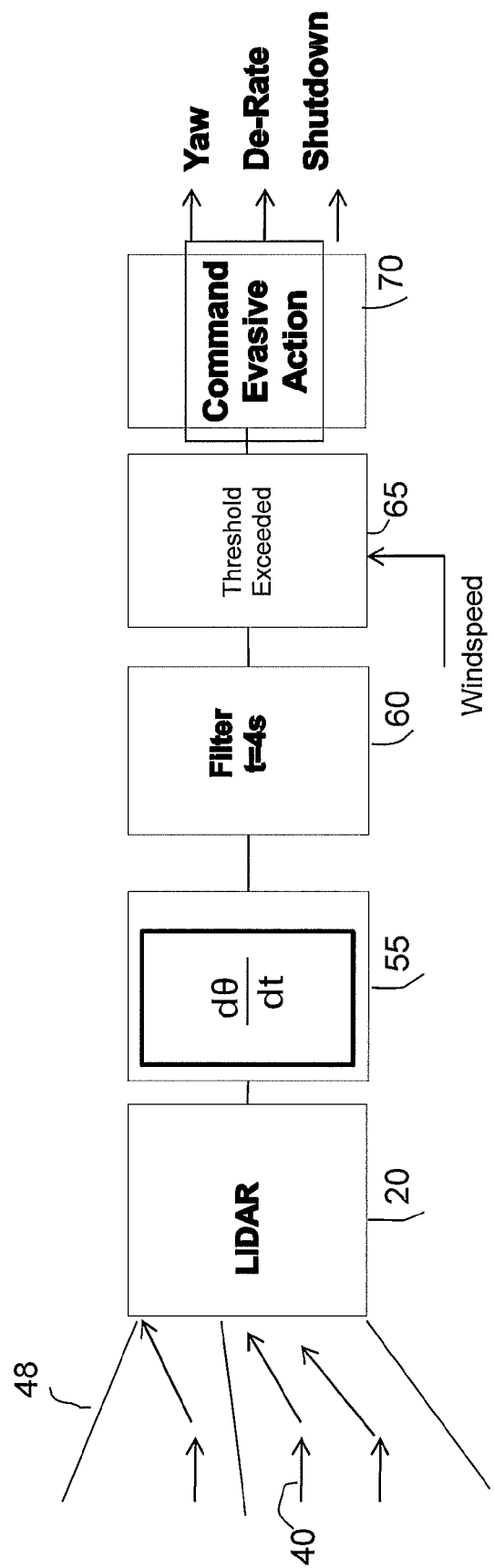
FIG. 6 shows a schematic diagram of a first embodiment of the invention which measures the angle of wind direction.
Figure 7:
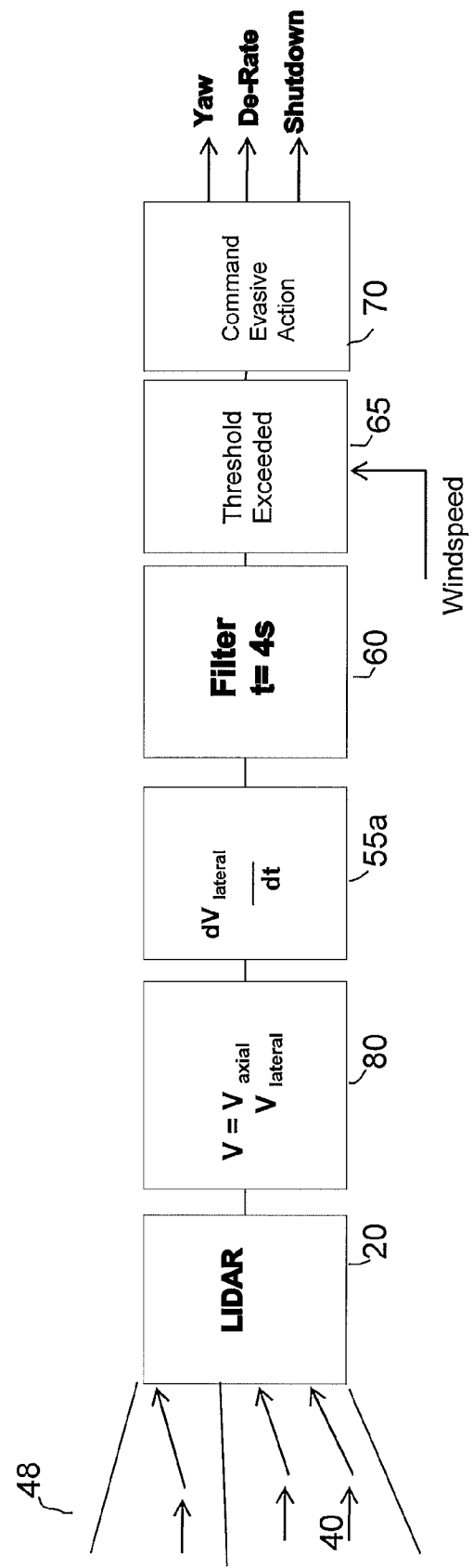
FIG. 7 shows a schematic diagram of a second embodiment of the invention in which a change of direction is determined for the acceleration of a lateral velocity component.

FIGS. 6 and 7 illustrate the two embodiments described. In FIG. 6, a Lidar 20 mounted on a wind turbine emits a plurality of beams 48 to detect a parameter of the upwind wind front 40. In this embodiment the Lidar is a multibeam Lidar which has a plurality of beams or look directions three being shown in the figure and which detect the wind direction which may be expressed as an angle ⊖ with respect to a known direction such as the axis of rotation of the wind turbine rotor. A differentiator 55 differentiates the measured angle with respect to time to give a value d⊖/dt and a filter 60 filters that signal over a predetermined period of time, here 4 seconds as discussed above. A threshold detector 65 receives the output from the filter and an indication of windspeed and determines whether the treshold hes been exceeded. The threshold detector includes a look up table of thresholds at different windspeeds. At 70, where the output of the threshold detector indicates an extreme event, the controller commands an evasive action and causes a parameter of the wind turbine to be adjusted accordingly. This parameter may be a total shut down command or a nacelle yaw command.

The embodiment of FIG. 7 is similar to that of FIG. 6 except that the controller acts on the output of the Lidar 20 at 80 to determine the wind velocity and resolves that velocity into two components: an axial velocity in the direction of the axis of rotation of the wind turbine rotor, and a lateral velocity being the velocity in the plane of the rotor or normal to the axis of rotation. The differentiator 55A acts on the lateral velocity to provide an output to the filter 60 $dV_{lateral}/dt$ which is the lateral acceleration of the wind and therefore indicative of a change in direction.

Thus, embodiments of the invention enable extreme changes of direction to be detected and evasive action taken before the events arrive at the wind turbine. This enables the design constraints on the turbine to be changed so that they do not have to withstand loading caused by extreme changes in wind direction This in turn enables wind turbine designers to use lighter components reducing the cost of wind turbines and thus the cost of producing energy. Alternatively, it enables existing components to be operated at higher rated output powers thus boosting the energy that can be extracted by a given turbine.

Many modifications to the embodiments described above are possible and will occur to those skilled in the art without departing from the invention.

For example, the controller may be mounted on, and be part of, an individual turbine, or it may be a remote controller which controls multiple turbines which form a wind park or a part of a wind park. The scope of which is defined by the following claims.

The invention claimed is:

1. A control system for a wind turbine, the control system comprising:
    a sensing device mounted on the wind turbine, the sensing device configured to sense a wind speed at a position upwind of the wind turbine; and
    a controller comprising a differentiator and a filter, the controller configured to:
        detect, using signals received from the sensing device, a predefined extreme change event in wind direction upwind of the wind turbine, wherein detecting the predefined extreme change event in the wind direction comprises:
            determining, using the differentiator, an instantaneous rate of change of the wind direction, and
            determining, using the filter, whether the instantaneous rate of change of the wind direction exceeds a predetermined value for a
        predetermined period of time, wherein the predetermined value depends on a magnitude of the sensed wind speed; and
        generate, in response to detecting the extreme change event, one or more control signals to vary an operating parameter of the wind turbine.

2. A control system according to claim 1, wherein the predetermined value of the instantaneous rate of change of the wind direction is 5 degrees per second (°/s).

3. A control system according to claim 1, wherein the predetermined period of time is at least 3 seconds.

4. A control system according to claim 1, wherein the controller further comprises:
  a splitter for resolving wind speed signals from the sensing device into an axial component and a lateral component,
  wherein determining the instantaneous rate of change of the wind direction comprises:
    determining, using the lateral component, an instantaneous rate of change of a lateral wind speed.

5. A control system according to claim 1, wherein the sensing device is a multiple beam Lidar.

6. A control system according to claim 5, wherein the Lidar is a multiple range gate Lidar.

7. A control system according to claim 1, wherein the one or more control signals generated by the controller in response to detecting the extreme change event comprises a turbine shutdown command.

8. A control system according to claim 1, wherein the one or more control signals generated by the controller in response to detecting the extreme change event of comprises a turbine yaw command.

9. A control system according to claim 8, wherein the one or more control signals further comprise a command to de-rate the wind turbine until completion of a yawing action specified by the turbine yaw command.

10. A method of controlling a wind turbine, the method comprising:
  sensing, using a remote sensing device mounted on the wind turbine, a wind speed at a position upwind of the wind turbine;
  detecting, using signals received from the sensing device at a controller of the wind turbine, a predefined extreme change event in wind direction upwind of the wind turbine, wherein detecting the predefined extreme change event in the wind direction comprises:
    determining, using a differentiator of the controller, an instantaneous rate of change of the wind direction, and
    determining, using a filter of the controller, whether the instantaneous rate of change of the wind direction exceeds a predetermined value for a predetermined period of time, wherein the predetermined value depends on a magnitude of the sensed wind speed; and
  generating, in response to detecting the extreme change event, one or more control signals to vary an operating parameter of the wind turbine.

11. A method according to claim 10, wherein the predetermined value of the instantaneous rate of change of the wind direction is 5 degrees per second (°/s).

12. A method according to claim 10, wherein the predetermined period of time is at least 3 seconds.

13. A method according to claim 10, further comprising:
  resolving wind speed signals from the remote sensing device into an axial component and a lateral component,
  wherein determining the instantaneous rate of change of the wind direction comprises:
    determining, using the lateral component, an instantaneous rate of change of a lateral wind speed.

14. A method according to claim 10, wherein sensing the wind speed at the position upwind of the wind turbine comprises:
  sensing a first wind speed at a first distance upwind of the wind turbine, and
  sensing a second wind speed at a second distance upwind of the wind turbine.

15. A method according to claim 10, wherein the one or more control signals generated in response to detecting the extreme change event comprises a turbine shutdown command.

16. A method according to claim 10, wherein the one or more control signals generated in response to detecting the extreme change event comprises a turbine yaw command.

17. A method according to claim 16, wherein the one or more control signals further comprise a command to de-rate the wind turbine until completion of a yawing action specified by the turbine yaw command.

18. A system, comprising:
  a wind turbine;
  a sensing device mounted on the wind turbine, the sensing device configured to sense a wind speed at a position upwind of the wind turbine; and
  a controller comprising a differentiator and a filter, the controller configured to:
    detect, using signals received from the sensing device, a predefined extreme change event in wind direction upwind of the wind turbine, wherein detecting the predefined extreme change event in the wind direction comprises:
      determining, using the differentiator, an instantaneous rate of change of the wind direction, and
      determining, using the filter, whether the instantaneous rate of change of the wind direction exceeds a predetermined value for a predetermined period of time, wherein the predetermined value depends on a magnitude of the sensed wind speed; and
    generate, in response to detecting the extreme change event, one or more control signals to vary an operating parameter of the wind turbine.

* * * * *